UNITED STATES PATENT OFFICE.

JOHN H. KELLOGG, OF BATTLE CREEK, MICHIGAN.

FOOD PRODUCT.

No. 869,371. Specification of Letters Patent. Patented Oct. 29, 1907.

Application filed February 24, 1906. Serial No. 302,810.

*To all whom it may concern:*

Be it known that I, JOHN H. KELLOGG, a citizen of the United States, residing at Battle Creek, in the county of Calhoun, in the State of Michigan, have invented certain new and useful Improvements in Food Products, of which the following is a specification.

This invention relates to improvements in food products, and the process of preparing the same.

The main object of this invention is to provide an improved food product which is very palatable and nourishing and one adapted for use as a meat substitute. Second to provide a process for making such food product by which it can be economically and satisfactorily produced.

Further objects, will definitely appear from the detailed description to follow.

This invention is clearly defined and pointed out in the claims.

In the preparation of my improved food product, I use the following ingredients, preferably in the following proportions: casein, wet, 37½%, gluten, wet, about 37½%, and vegetable oil, about 25%. I preferably combine these ingredients in the following manner: I prepare the gluten, preferably from wheat flour, by washing out the starch. I preferably precipitate the casein in milk with acetic, hydrochloric or sulfuric acid. The gluten and casein are then mixed, preferably by passing through a shredding machine, during which process the oil is added. After thoroughly mixing the ingredients, the mixture is put into cans and cooked. The temperature of the cooking may be considerably varied, but it is preferably from 180° to 220° Fahrenheit, or it may be cooked at even a greater temperature, if desired. Would state, moreover, that the higher the temperature and the longer it is cooked, the darker and more highly flavored the product will be. After the cooking, the food is ready for serving, and may be either served directly from the can or can be prepared in a great variety of ways. The product, by this treatment, is given a meaty consistency and is quite like some meats in flavor. My improved food product is very nourishing and may be used as a meat substitute and is designed by me to be so used, although, of course, its use is optional.

If desired my improved food product may be dried and made into a powder for use in making soups broths and similar preparations. In its dried and powdered form, it has the advantage of small bulk and weight.

I prefer to use a corn oil in the preparation of my improved food, although a nut oil, or some other vegetable oil, may be used. The oil is made to combine with other ingredients by thorough manipulation, a low temperature being maintained until the mass becomes homogeneous, in which condition it is fixed by the cooking process which follows.

While I prefer to combine the ingredients in about the proportions specified, I desire to state that they may be very greatly varied and a valuable product still be secured, although, of course, its food value will be more or less affected by such variation.

My improved food products possess excellent keeping qualities and, as before remarked, may be used in a great variety of ways.

While the elements may be combined most effectually and economically by the process I have described, I am aware that there are other means of accomplishing that result.

Having thus described my invention, what I claim as new and desire to secure by Letters Patent, is:

1. An improved food compound consisting of casein, gluten and corn oil, combined in about the proportions stated into a homogeneous cooked mixture of a meat-like consistency and flavor.

2. An improved food compound consisting of casein, gluten and a vegetable oil, combined in about the proportions stated into a homogeneous cooked mixture of a meat-like consistency and flavor.

In witness whereof, I have hereunto set my hand and seal in the presence of two witnesses.

JOHN H. KELLOGG. [L. S.]

Witnesses:
ROY V. ASHLEY,
L. McCOY.